Patented Jan. 30, 1923.

1,443,454

UNITED STATES PATENT OFFICE.

LEVIS MILLER BOOTH, OF PLAINFIELD, NEW JERSEY.

PROCESS OF MANUFACTURING PAPER OR PULP.

No Drawing. Application filed April 13, 1921. Serial No. 461,049.

*To all whom it may concern:*

Be it known that I, LEVIS MILLER BOOTH, a citizen of the United States, residing at 975 Cedar Brook Road, Plainfield, in the county of Union and State of New Jersey, have invented certain new and useful Improvements in Processes of Manufacturing Paper or Pulp.

This invention relates to the process of manufacturing paper or pulp on a Fourdrinier or other paper machine where the stock is suspended in water and is applied to a screen. By the processes heretofore in use, a substantial portion of the fibre and loading material, together with nearly all of the water passes through this screen and is either wasted or goes through a save-all or reclaimer wherein a portion of the fibre and loading material is recovered and retained for re-use. The material which passes through the screen of the machine, consisting of fibre, loading material and water, is technically known as "white water." The solid particles in the white water which pass through the screen on the machine, are very minute and therefore settle slowly, with a result that a considerable portion of them pass out with the liquid portion and are wasted where paper or pulp is manufactured by practices heretofore known.

The object of my invention is to reclaim the fibre and loading material from white water which was heretofore lost. The white water heretofore has been passed solely through a reclaimer wherein it was intended that the solid portion of the white matter should settle by natural sedimentation, or through a screening save-all. Many of the solid particles, however, settled so slowly, and were so minute, that they were carried away by the water and lost. My invention consists in adding chemical reagents to the white water, fed either separately or together, in either solid or liquid form, the ratio of such chemicals, the one to the other being such that the treatment will not cause a change in the reaction, either acid or alkaline, of the white water so treated, the reagents being such as will cause such a coagulation of the finely divided and minute particles of solid matter in the white water, as will aid the sedimentation of such solid matter and produce such concentration as will render them conveniently available for re-use.

In practicing my invention I have successfully used a mixture of sulphate of aluminum and sodium carbonate in the ratio of substantially two (2) to one (1), applied as a powder to the white water entering the reclaimer. However, I do not desire to limit myself to these two reagents, but can use any two reagents which will cause a coagulation of the finely divided solids of the white water and which will aid the sedimentation of said solids which are then in greater concentration, conveniently available for re-use.

Having described my invention, I claim:

1. The process of manufacturing paper or pulp, consisting of reclaiming for reuse the solid particles in the white water by the addition thereto of such reagents as will assist by coagulation in the sedimentation of said solid particles.

2. The process of manufacturing paper or pulp, consisting of reclaiming for reuse the solid particles in the white water by the addition thereto, in dry form separately, of such reagents as will assist by coagulation in the sedimentation of said solid particles.

3. The process of manufacturing paper or pulp, consisting of reclaiming for reuse the solid particles in the white water by the addition thereto, in dry form, a mixture of such reagents as will assist by coagulation in the sedimentation of said solid particles.

4. The process of manufacturing paper or pulp, consisting of reclaiming for reuse the solid particles in the white water by the addition thereto, in soluble form separately, of such reagents as will assist by coagulation in the sedimentation of said solid particles.

5. The process of manufacturing paper or pulp, consisting of reclaiming for reuse the solid particles in the white water by the addition thereto, a liquid mixture of such reagents as will assist by coagulation in the sedimentation of said solid particles.

6. The process of manufacturing paper or pulp, consisting of reclaiming for reuse the solid particles in the white water by such reagents as will assist by coagulation in the sedimentation of such solid particles and will not change the reaction either acid or alkaline of the water so treated.

Signed at Elizabeth, New Jersey, this 11th day of April, 1921.

LEVIS MILLER BOOTH.